United States Patent
O et al.

(10) Patent No.: US 8,155,921 B2
(45) Date of Patent: Apr. 10, 2012

(54) POWER TRANSMISSION LINE DIP MEASUREMENT METHOD

(75) Inventors: Seon Ung O, Kwangjoo (KR); Chul Won Seo, Kwanjoo (KR); Baek Seob Sim, Yongin-si (KR)

(73) Assignee: KPS Co., Ltd., Kyounggi-do (KR)

( * ) Notice: Subject to any disclaimer, the term of this patent is extended or adjusted under 35 U.S.C. 154(b) by 337 days.

(21) Appl. No.: 12/630,242

(22) Filed: Dec. 3, 2009

(65) Prior Publication Data
US 2010/0138186 A1 Jun. 3, 2010

(30) Foreign Application Priority Data

Dec. 3, 2008 (KR) .................. 10-2008-0121668

(51) Int. Cl.
*G06F 19/00* (2011.01)
(52) U.S. Cl. .................................................. 702/166
(58) Field of Classification Search .......... 702/166, 702/167, 179, 150, 182–185, 188
See application file for complete search history.

(56) References Cited

U.S. PATENT DOCUMENTS

| 6,205,867 B1 | 3/2001 | Hayes et al. |
| 7,641,387 B2 * | 1/2010 | Engelhardt et al. ........... 374/142 |

* cited by examiner

*Primary Examiner* — Edward Raymond
(74) *Attorney, Agent, or Firm* — Jordan and Hamburg LLP

(57) ABSTRACT

A power transmission line dip measurement method is disclosed. The dip measurement method includes installing a measurement instrument at a place where power line support points of steel towers can be seen from the ground, collimating the measurement instrument at the power line support point of one of the steel towers, transmitting a collimated value to a PDA in a wired or wireless manner, collimating the measurement instrument at the power line support point of the other steel tower, transmitting a collimated value to the PDA, calculating the collimated values to display a horizontal angle position of a dip base line, and adjusting an angle of the measurement instrument based on the horizontal angle displayed on a screen of the PDA by a worker, collimating the measurement instrument at a power line dip point as a dip base point, and displaying a dip value on the screen of the PDA.

5 Claims, 13 Drawing Sheets

RELATED ART

FIG. 6

| DIP MEASUREMENT | | | ☒ |
|---|---|---|---|
| MEASUREMENT | DATA | SET | SAEETY SEPARATION |

SLOPE DISTANCE ☐

HORIZONTAL DISTANCE ☐

SLOPE DIP ☐

STEEL TOWER ID ☐  SAVE

DATA RESULT SCREEN

FIG. 9

- BASE POINT = (0, 0, 0)
- BASE HEIGHT = 0
- P1 = (BASE POINTx, BASE POINTy, BASE POINTz +BASE HEIGHT) = (0, 0, 0)

- POWER LINE SUPPORT POINT Pa = (40.67 , -161.962 , 36.673)
  Pb = (-163.734 , 28.685 , 44.251)
- DIP POINT AZIMUTH ANGLE = 222.7169 DEGREES (222° 43' 1")
  PERPENDICULAR ANGLE = 70.3978 DEGREES
- hd = sin(70.3978) = 0.9420
- P2x = P1x + 0.9420 * sin( 222.7169 ) = -0.6391
- P2y = P1y + 0.9420 * cos( 222.7169 ) = -0.6921
- P2z = P1z + 1.0000 * cos( 70.3978 ) = 0.3355

- Pc = ((Pax+Pbx)/2, (Pay+Pby)/2, (Paz+Pbz)/2 + 100)
  = ( -61.532 , -66.639 , 140.462 )

- Nx = (Pby-Pay)*(Pcz-Paz) - (Pbz-Paz)*(Pcy-Pay)
  = (28.685 - -161.962 )*( 140.462 - 36.673) -
    (44.251 - 36.673 )*( 166.639 - -161.962 )
  = 19064.7

Ny = Pbz-Paz)*(Pcx-Pax) - (Pbx-Pax)*(Pcz-Paz)
  = ( 44.251 - 36.673 )*( -61.532 - 40.670 ) -
    (-163.734 - 40.670 )*(140.462 - 36.673 )
  = 20440.4

Nz = (Pbx-Pax)*(Pcy-Pay) - (Pby-Pay)*(Pcx-Pax)
  = (-163.734 - 40.670 )*( -66.639 - -161.962 ) -
    ( 28.685 - -161.962 )*( -61.532 - 40.670)
  = 0

- mag = root of ((19064.7)$^2$ + ( 20440.4 )$^2$)
  = 27951.256

- Nx = Nx/mag = 0.68207

Fig. 9 (continued)

$Ny = Ny/mag = 0.73129$ $Nz = 0$

- $d = Pax*Nx + Pay*Ny + Paz*Nz$ $= 40.67 * 0.68207 + -161.962*0.731287 + 36.673 * 0$ $= -90.7010$

- $t = (d-P1.N)/(P2-P1).N$ $= (d-Nx*P1x-Ny*P1y-Nz*P1z)/(Nx*(P2x-P1x)+Ny*(P2y-P1y)+Nz*(P2z-P1z))$ $= d/(Nx*P2x+Ny*P2y+Nz*P2z)$ $= -90.7010 / ((0.68207 * -0.6391) + (0.73129 * -0.6921 ))$ $= 96.28223$

- $IPx = P1x + t(P2x-P1x) = 96.28223 * ( -0.6321 ) = -61.5302$
- $IPy = P1y + t(P2y-P1y) = 96.28223 * ( -0.6921 ) = -66.6401$
- $IPz = P1z + t(P2z-P1z) = 96.28223 * ( 0.3355 ) = 32.3015$

- SLOPE DIP $= (Paz+Pbz)/2 - 1pz = (36.6730 + 44.2510 )/2 - 32.3015$ $= 8.16$

FIG. 10

EXAMPLE OF DIP MEASUREMENT METHOD

⊙ BASE POINT = (0, 0, 0)

⊙ BASE HEIGHT = 0

⊙ P1 = (BASE POINTx, BASE POINTy, BASE POINTz +BASE HEIGHT) = (0, 0, 0)

⊙ POWER LINE SUPPORT POINT Pa = (-14.595 , 39.399 , 22.524)
　　　　　　　　　　　　　　　　Pb = ( 104.574 , 260.966 , 24.591)

⊙ DIP POINT AZIMUTH ANGLE = 16.6761 DEGREES (16° 40' 34")
　　　　　　　PERPENDICULAR ANGLE = 84.9508 DEGREES (84° 57' 3")

⊙ hd = sin(84.9508) = 0.9961

⊙ P2x = P1x + 0.9961 * sin( 16.6761 ) = 0.2858

⊙ P2y = P1y + 0.9961 * cos( 16.6761 ) = 0.9542

⊙ P2z = P1z + 1.0000 * cos( 84.9508 ) = 0.0880

⊙ Pc = ((Pax+Pbx)/2, (Pay+Pby)/2, (Paz+Pbz)/2 + 100)
　　　= ( 44.99 , 150.183 , 123.5575 )

⊙ Nx = (Pby-Pay)*(Pcz-Paz) - (Pbz-Paz)*(Pcy-Pay)
　　　= (260.966 - 39.399 )*( 123.558 - 22.524) -
　　　　(24.591 - 22.524 )*( 150.183 - 39.399 )
　　　= 22156.7

Ny = Pbz-Paz)*(Pcx-Pax) - (Pbx-Pax)*(Pcz-Paz)
　　　= ( 24.591 - 22.524 )*( 44.990 - -14.595 ) -
　　　　( 104.574 - -14.595 )*(123.558 - 22.524 )
　　　= -11916.9

Nz = (Pbx-Pax)*(Pcy-Pay) - (Pby-Pay)*(Pcx-Pax)
　　　= ( 104.574 - -14.595 )*( 150.183 - 39.399 ) -
　　　　( 260.966 - 39.399 )*( 44.990 - -14.595)
　　　= 0

⊙ mag = root of ((22156.7)$^2$ + ( -11916.9 )$^2$)
　　　 = 25158.137

Fig. 10 (continued)

- $N_x = N_x/\text{mag} = 0.88070$
  $N_y = N_y/\text{mag} = -0.4737$
  $N_z = 0$

- $d = P_{ax}*N_x + P_{ay}*N_y + P_{az}*N_z$
  $= 14.595 * 0.880697 + 39.399 * -0.47368 + 22.524 * 0$
  $= -31.5163$

- $t = (d-P1.N)/(P2-P1).N$
  $= (d-N_x*P1_x-N_y*P1_y-N_z*P1_z)/(N_x*(P2_x-P1_x)+N_y*(P2_y-P1_y)+N_z*(P2_z-P1_z))$
  $= d/(N_x*P2_x+N_y*P2_y+N_z*P2_z)$
  $= -31.5163 / ((0.88070 * 0.2858) + (-0.4737 * 0.9542))$
  $= 157.38322$

- $IP_x = P1_x + t(P2_x-P1_x) = 157.38322 * (0.2858) = 44.9876$
- $IP_y = P1_y + t(P2_y-P1_y) = 157.38222 * (0.9542) = 150.1790$
- $IP_z = P1_z + t(P2_z-P1_z) = 157.38222 * (0.0880) = 13.8514$

- SLOPE DIP $= (P_{az}+P_{bz})/2 - 1p_z = (22.5240 + 24.5910)/2 - 13.8514$
  $= 9.706$

FIG. 11

EXAMPLE OF DIP MEASUREMENT METHOD

- BASE POINT = (0, 0, 0)
- BASE HEIGHT = 0
- P1 = (BASE POINTx, BASE POINTy, BASE POINTz +BASE HEIGHT) = (0, 0, 0)

- POWER LINE SUPPORT POINT Pa = (272.199 , 32.826 , 28.02)
  Pb = ( -26.427 , 154.841 , 36.946)
- DIP POINT AZIMUTH ANGLE = 52.7828 DEGREES (52° 46' 58")
  PERPENDICULAR ANGLE = 84.9508 DEGREES (81° 23' 3")
- hd = sin(81.3842) = 0.9887
- P2x = P1x + 0.9887 * sin( 52.7828 ) = 0.7874
- P2y = P1y + 0.9887 * cos( 52.7828 ) = 0.5980
- P2z = P1z + 1.0000 * cos( 81.3842 ) = 0.1498

- Pc = ((Pax+Pbx)/2, (Pay+Pby)/2, (Paz+Pbz)/2 + 100)
  = ( 122.866 , 93.334 , 132.483 )

- Nx = (Pby-Pay)*(Pcz-Paz) - (Pbz-Paz)*(Pcy-Pay)
  = (154.841 - 31.826 )*( 132.488 - 28.020) -
    (36.946 - 28.020 )*( 93.334 - 31.826 )
  = 12301.5
 Ny = Pbz-Paz)*(Pcx-Pax) - (Pbx-Pax)*(Pcz-Paz)
  = ( 36.946 - 28.020 )*( 122.886 - 272.199 ) -
    ( -26.427 - 272.199 )*(132.483 - 28.020 )
  = 29862.6
 Nz = (Pbx-Pax)*(Pcy-Pay) - (Pby-Pay)*(Pcx-Pax)
  = ( -26.427 - 272.199 )*( 93.334 - 31.826 ) -
    ( 154.841 - 31.826 )*( 122.886 - 272.199)
  = 0

- mag = root of ((12301.5)$^2$ + ( -29862.6 )$^2$)
  = 32297.086

Fig. 11 (continued)

- $N_x = N_x/\text{mag} = 0.38089$
  $N_y = N_y/\text{mag} = 0.92462$
  $N_z = 0$

- $d = P_{ax}*N_x + P_{ay}*N_y + P_{az}*N_z$
  $= 272.199 * 0.380886 + 31.826 * 0.924622 + 28.02 * 0$
  $= 133.1037$

- $t = (d-P1.N)/(P2-P1).N$
  $= (d-N_x*P1_x-N_y*P1_y-N_z*P1_z)/(N_x*(P2_x-P1_x)+N_y*(P2_y-P1_y)+N_z*(P2_z-P1_z))$
  $= d/(N_x*P2_x+N_y*P2_y+N_z*P2_z)$
  $= 133.1037 / ((0.38089 * 0.7874) + (0.92462 * 0.5980))$
  $= 156.07288$

- $IP_x = P1_x + t(P2_x-P1_x) = 156.07288 * (0.7874) = 122.8858$
- $IP_y = P1_y + t(P2_y-P1_y) = 156.07288 * (0.5980) = 93.3336$
- $IP_z = P1_z + t(P2_z-P1_z) = 156.07288 * (0.1498) = 23.3811$

- SLOPE DIP $= (P_{az}+P_{bz})/2 - I_{pz} = (28.0200 + 36.9460)/2 - 23.3811$
  $= 9.102$

POWER TRANSMISSION LINE DIP MEASUREMENT METHOD

BACKGROUND OF THE INVENTION

1. Field of the Invention

The present invention relates to a power transmission line dip measurement method, and more particularly to a power transmission line dip measurement method that is capable of easily and accurately constructing a power cable based on a designed dip during the construction of the power line at power transmission steel towers and, in addition, of accurately measuring a dip of an already constructed power line.

2. Description of the Related Art

Generally, the shortest straight distance between a straight line linking power line support positions of two power transmission steel towers and a vertex of a power line is referred to as a power line dip D. The vertex is the lowest point of a curve formed by the power line when the power line is connected to the power line support positions of the power transmission steel towers.

A conventional power line dip measurement method is an indirect type measurement method in which two workers individually climb two steel towers that support a power line and observe a tangent of the power line using a dip chuck and an observation mirror over a predetermined length of the power line to calculate the maximum magnitude of a dip in a measurement section.

In order to measure the power line dip D, the height between the power line support points and the tangent is actually measured at the steel towers, an observation point and a dip chuck installation points are set, and the power line is observed using an observation instrument, such as the observation mirror, such that the tangent of the power line coincides with an observation line.

In the indirect type power line dip measurement using the tangent of the power line, however, all the processes are carried out on the steel towers, with the result that errors may be increased. In addition, the maintenance of accuracy is difficult due to the slope of the steel towers and complicated structure of the steel towers, with the result that measurement errors may be increased.

Also, the workers must climb up several positions of the steel towers according to the positions of power lines, with the result that it is difficult to secure the safety of the workers, and therefore, the workers may be exposed to danger. In addition, power line dip measurement time is increased, and the number of necessary workers is increased.

Also, it is difficult to perform accurate power line dip measurement and maintain the dip of the constructed power line for each phase and for each conductor. Furthermore, the dip difference between conductors may cause short circuits of wires.

SUMMARY OF THE INVENTION

Therefore, the present invention has been made in view of the above problems, and it is an object of the present invention to provide a power transmission line dip measurement method that is capable of automatically calculating the operating amount of a measurement instrument to a dip point using a vector calculation equation in which power line support points of two steel towers and the dip point are displayed as a space vector, thereby minimizing a measurement error.

In particular, measurement with the naked eye of each individual worker using a simple measurement instrument during the construction of the lower line is improved, and, in addition, it is possible for a single worker to perform measurement without climbing the steel tower, thereby improving working efficiency and management efficiency.

In accordance with the present invention, the above and other objects can be accomplished by the provision of a power transmission line dip measurement method including a measurement instrument installation step of installing a measurement instrument at a place where power line support points of two steel towers can be seen from the ground, a first collimation step of collimating the measurement instrument at the power line support point of one of the steel towers, a first transmission step of transmitting a collimated value to a personal digital assistant (PDA) in a wired or wireless manner, a second collimation step of collimating the measurement instrument at the power line support point of the other steel tower, a second transmission step of transmitting a collimated value to the PDA, an angle calculation step of calculating the transmitted collimated values to display a horizontal angle position of a dip base line, and a dip value display step of adjusting an angle of the measurement instrument based on the horizontal angle displayed on a screen of the PDA by a worker, collimating the measurement instrument at a power line dip point as a dip base point, and displaying a dip value on the screen of the PDA.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a construction view illustrating a data result screen of the PDA during the measurement of the dip of the already constructed power line according to the present invention;

FIG. 9 is a view illustrating a first embodiment of the dip measurement according to the present invention;

FIG. 10 is a view illustrating a second embodiment of the dip measurement according to the present invention; and FIG. 11 is a view illustrating a third embodiment of the dip measurement according to the present invention.

DETAILED DESCRIPTION OF THE INVENTION

Now, preferred embodiments of the present invention will be described in detail with reference to the accompanying drawings.

Figure 1A:
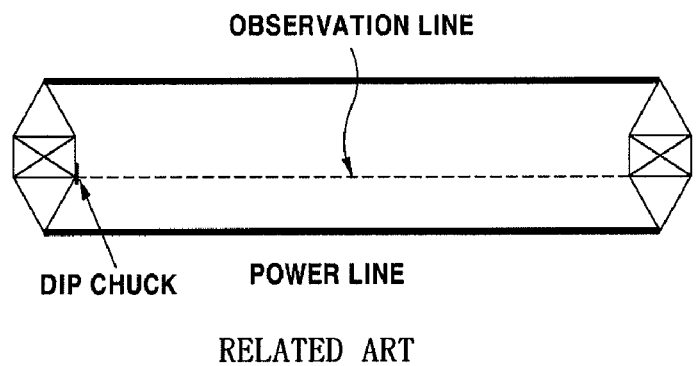
FIGS. 1A and 1B are conceptual views (plan and elevation, respectively) illustrating a conventional direct type power line dip measurement method.
Figure 1B:
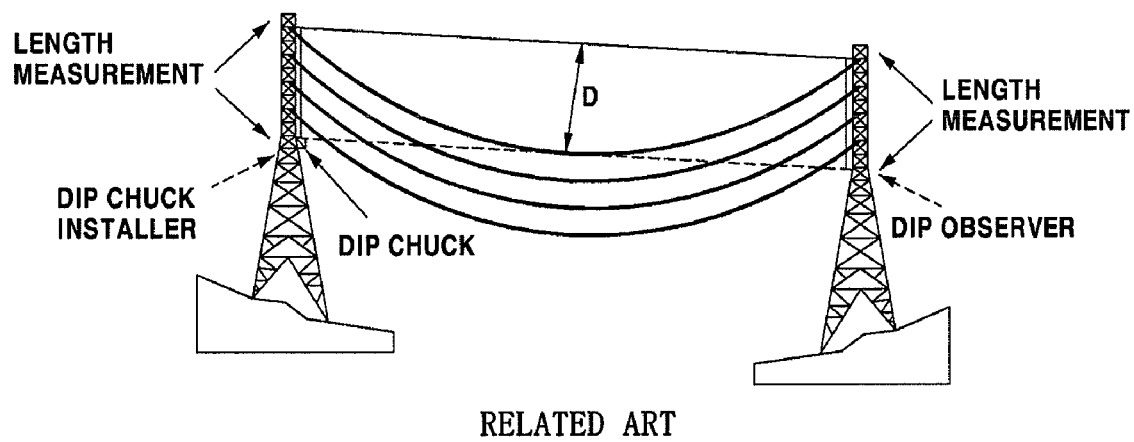
Figure 2:
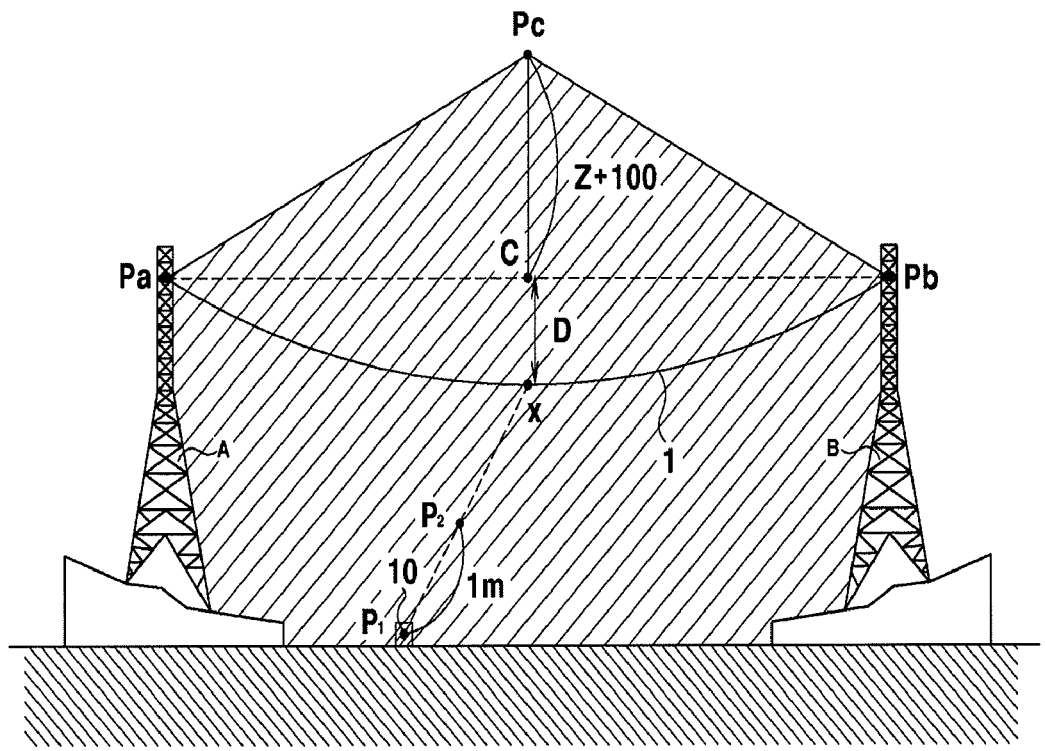
FIG. 2 is a conceptual view illustrating a power line dip measurement theory according to the present invention.

First, a dip measurement method according to the present invention will be described with reference to FIG. 2.

A normal vector, an azimuth angle, and a perpendicular angle of a plane formed by a power line support point Pa of a steel tower A, a power line support point Pb of a steel tower B, and a point Pc obtained by adding an arbitrary number, for example 100, to a z-coordinate value of a center point C between the power line support point Pa and the power line support point Pb are defined as N, h, and v, respectively.

When an arbitrary point, distant from a positional point P1 of a measurement instrument by 1 meter, of an imaginary line that links the positional point P1 and a power line dip point X is defined as P2, $hd = 1.0 * \sin(v)$ $P2x = P1x + hd*\sin(h)$; (x-coordinate of P2)

$P2y = P1y + hd*\cos(h)$; (y-coordinate of P2)

$P2z = P1z + 1*\cos(v)$; (z-coordinate of P2)

An equation of a straight line passing through the two points P1 and P2 is represented as follows:

$P = P1 + t(P2 - P1)$ (A), (where, t is an arbitrary real number, and P is an arbitrary point)

Normal vector N $N = (Pb - Pa) \times (Pc - Pa) \cdot$ (cross product)

$Nx = (Pby - Pay)*(Pcz - Paz) - (Pbz - Paz)*(Pcy - Pay)$; (x-coordinate of N)

$Ny = (Pbz - Paz)*(Pcx - Pax) - (Pbx - Pax)*(Pcz - Paz)$; (y-coordinate of N)

$Nz = (Pbx - Pax)*(Pcy - Pay) - (Pby - Pay)*(Pcx - Pax)$; (z-coordinate of N)

$mag = \mathrm{sqrt}(Nx*Nx + Ny*Ny + Nz*Nz)$ $Nx = Nx/mag$ (normalize)

$Ny = Ny/mag$ $Nz = Nz/mag$ an equation of a plane including the three points Pa, Pb and Pc is represented as follows:

$P \cdot N = d$ (B)

In Equations A and B, $(P1 + t(P2 - P1)) \cdot N = d$

A value of t is calculated and substituted into Equation A so as to calculate an intersection point IP.

$t = (d - P1 \cdot N)/(P2 - P1) \cdot N$ $= (d - Nx*P1x - Ny*P1y - Nz*P1z)/(Nx*(P2x - P1x) + Ny*(P2y - P1y) + Nz*(P2z - P1z))$ $d = Pa \cdot N$ (inner product)

$= Pax*Nx + Pay*Ny + Paz*Nz$

An intersection point IP between the plane and the straight line is calculated.

$IPx = P1x + t(P2x - P1x)$; (x-coordinate of IP)

$IPy = P1y + t(P2y - P1y)$; (y-coordinate of IP)

$IPz = P1z + t(P2z - P1z)$; (z-coordinate of IP)

-> Dip value $(D) = (Paz + Pbz)/2 - IPz$

Figure 3:
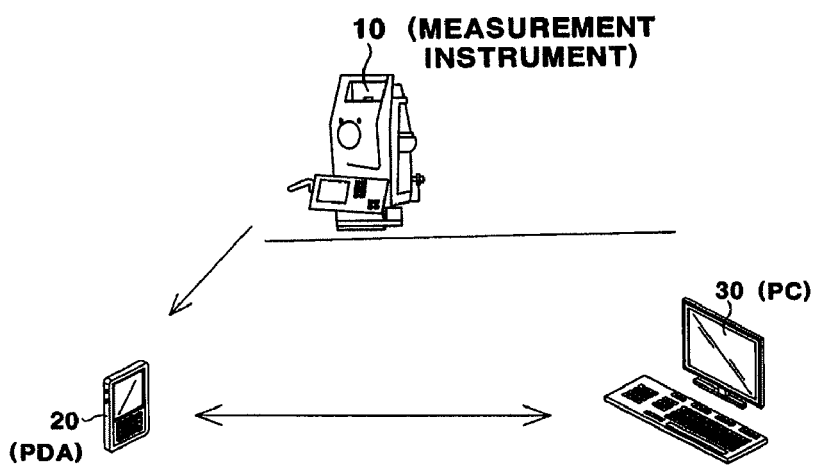
FIG. 3 is a construction view illustrating dip measurement equipment according to the present invention.

FIG. 3 is a construction view illustrating equipment for dip measurement according to the present invention. The dip measurement equipment includes a measurement instrument 10 for collimating a position, a personal digital assistant (FDA) 20 which a worker carries to perform a process, and a personal computer (PC) 30 to which measurement data are transmitted and stored.

<A Process of Measuring a Dip of an Already Constructed Power Line>

Figure 4:
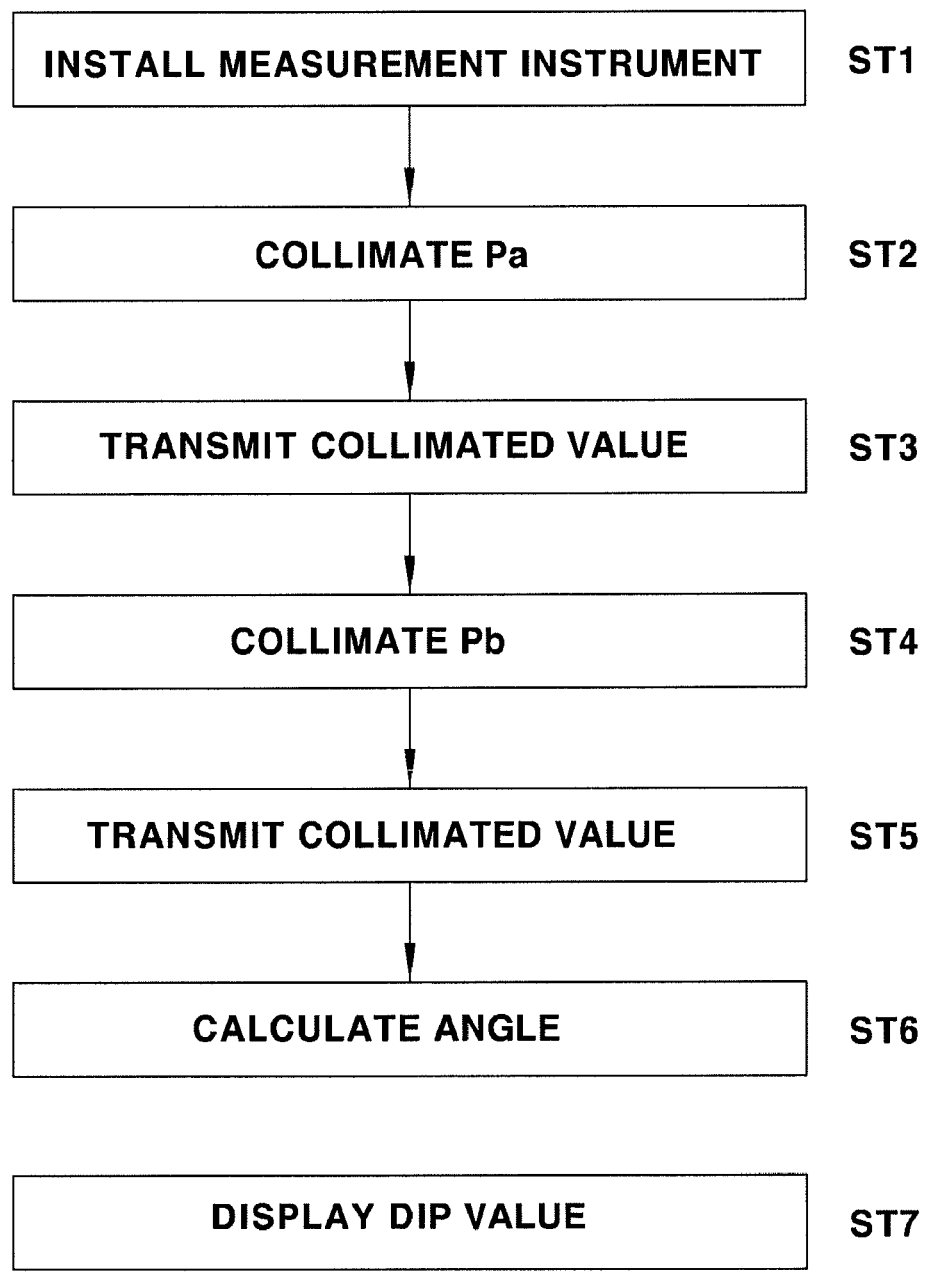
FIG. 4 is a flow chart illustrating a process of measuring a dip of an already constructed power line according to the present invention.

FIG. 4 is a flow chart illustrating a process of measuring a dip of an already constructed power line according to the present invention.

First, the measurement instrument 10 is installed at a place where the two steel towers A and B can be seen to measure a dip value of a power line 1 in a state in which the power line 1 is installed at the steel towers A and B between which a dip measurement section is defined (ST 1).

Figure 5:
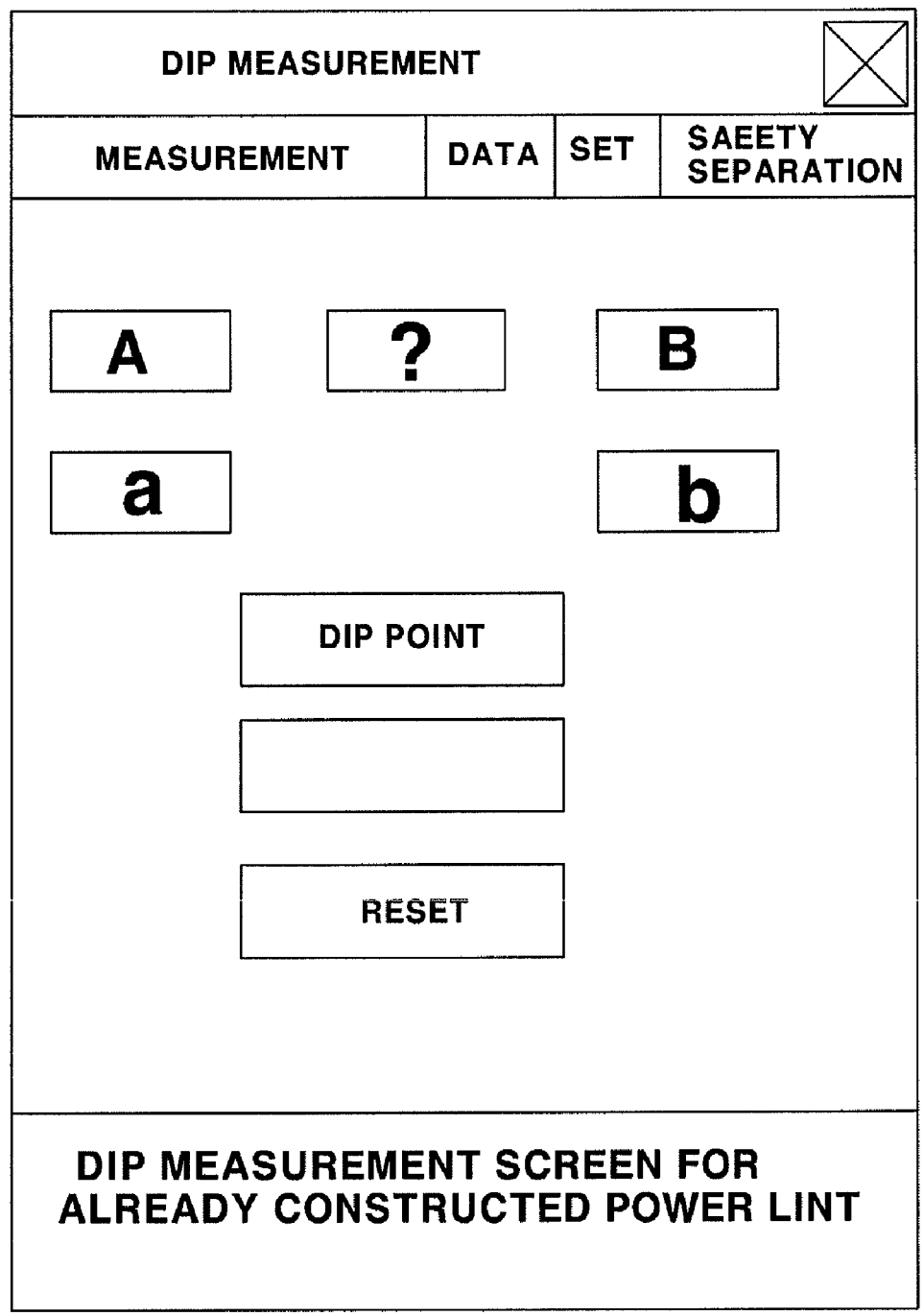
FIG. 5 is a construction view illustrating a dip measurement screen of a personal digital assistant (PDA) during the measurement of the dip of the already constructed power line according to the present invention.

Subsequently, the measurement instrument 10 is collimated at the power line support point Pa of the steel tower A (ST 2), and then an "A" icon on a measurement screen of the PDA 20 as shown in FIG. 5 is touched by a worker such that a collimated value is transmitted from the measurement instrument 10 to the PDA 20 (ST 3).

Subsequently, the measurement instrument 10 is collimated at the power line support point Pb of the steel tower B (ST 4), and then a "B" icon on the measurement screen of the FDA 20 is touched by the worker such that a collimated value is transmitted from the measurement instrument 10 to the PDA 20 (ST 5).

Subsequently, a "?" icon on the measurement screen of the PDA 20 is touched by the worker, with the result that a horizontal azimuth angle v of a dip base line is automatically calculated and displayed (ST 6).

Subsequently, the worker horizontally adjusts the angle of the measurement instrument 10 based on the calculated horizontal azimuth angle v to set the measurement instrument 10 at the dip center point C. After that, the worker lowers the measurement instrument 10 such that the measurement instrument 10 is collimated at the power line dip point X where the measurement instrument 10 joins the power line 1, and then touches a "dip point" icon on the measurement screen of the FDA 20.

As a result, the calculated measurement dip value is displayed on a data result screen of the FDA 20 as shown in FIG. 6 such that the worker can confirm the dip value (ST 7).

FIGS. 9 to 11 illustrates dip values measured by the above-described method in a state in which a station point at which the measurement instrument 10 is located is set to a base point (0, 0, 0). As can be seen from FIG. 9, a slope dip value of 8.160 is measured. As can be seen from FIG. 10, a slope dip value of 9.706 is measured. As can be seen from FIG. 11, a slope dip value of 9.102 is measured.

<A Process of Measuring a Dip of a Power Line to be Constructed>

Figure 7:
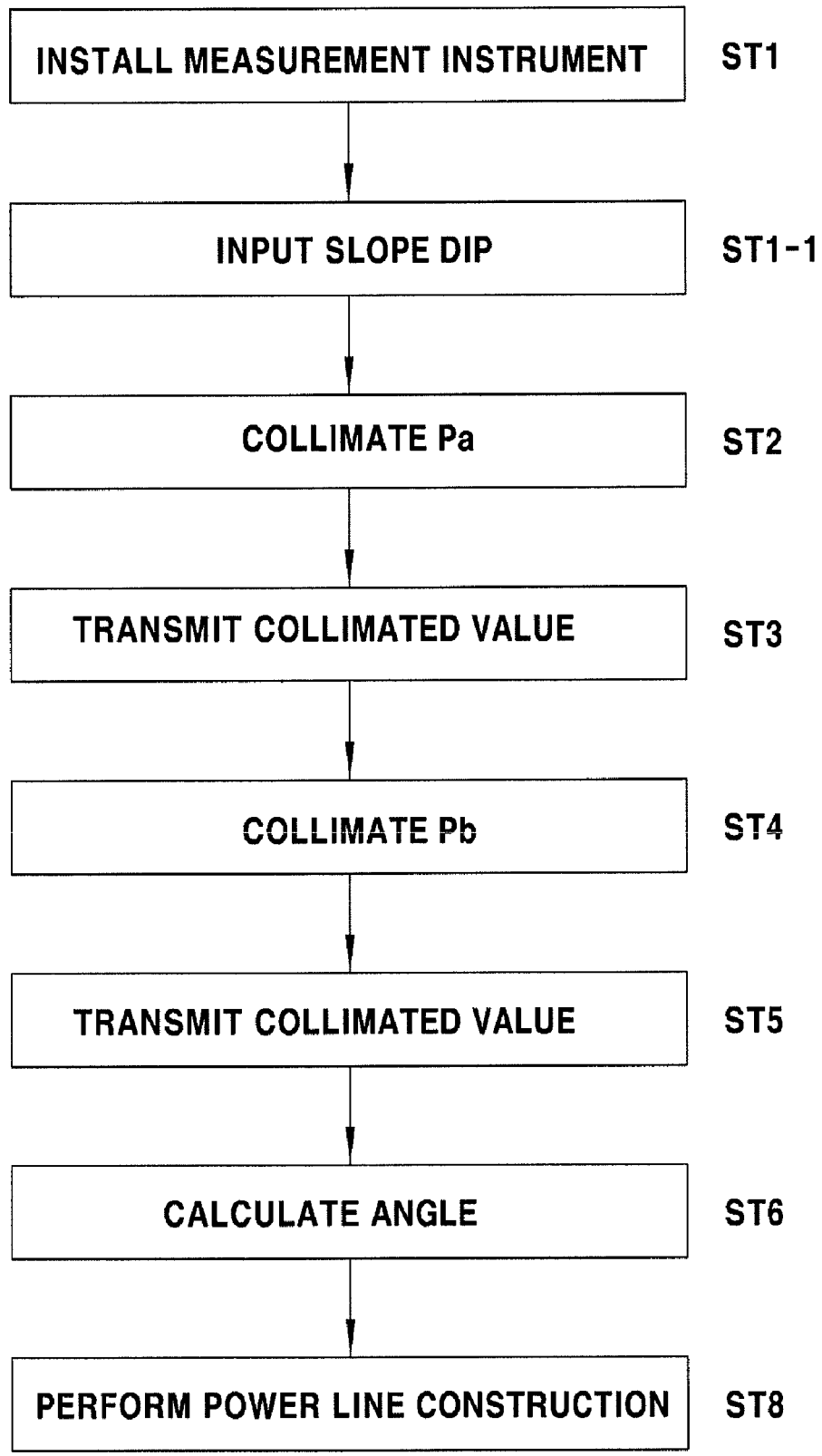
FIG. 7 is a flow chart illustrating a process of measuring a dip of a power line to be constructed according to the present invention.

FIG. 7 is a flow chart illustrating a process of measuring a dip of a power line to be constructed according to the present invention.

First, the measurement instrument 10 is installed at a place where points, at which a power line will be supported, of the two steel towers A and B between which a dip measurement section is defined can be seen (ST 1).

Figure 8:
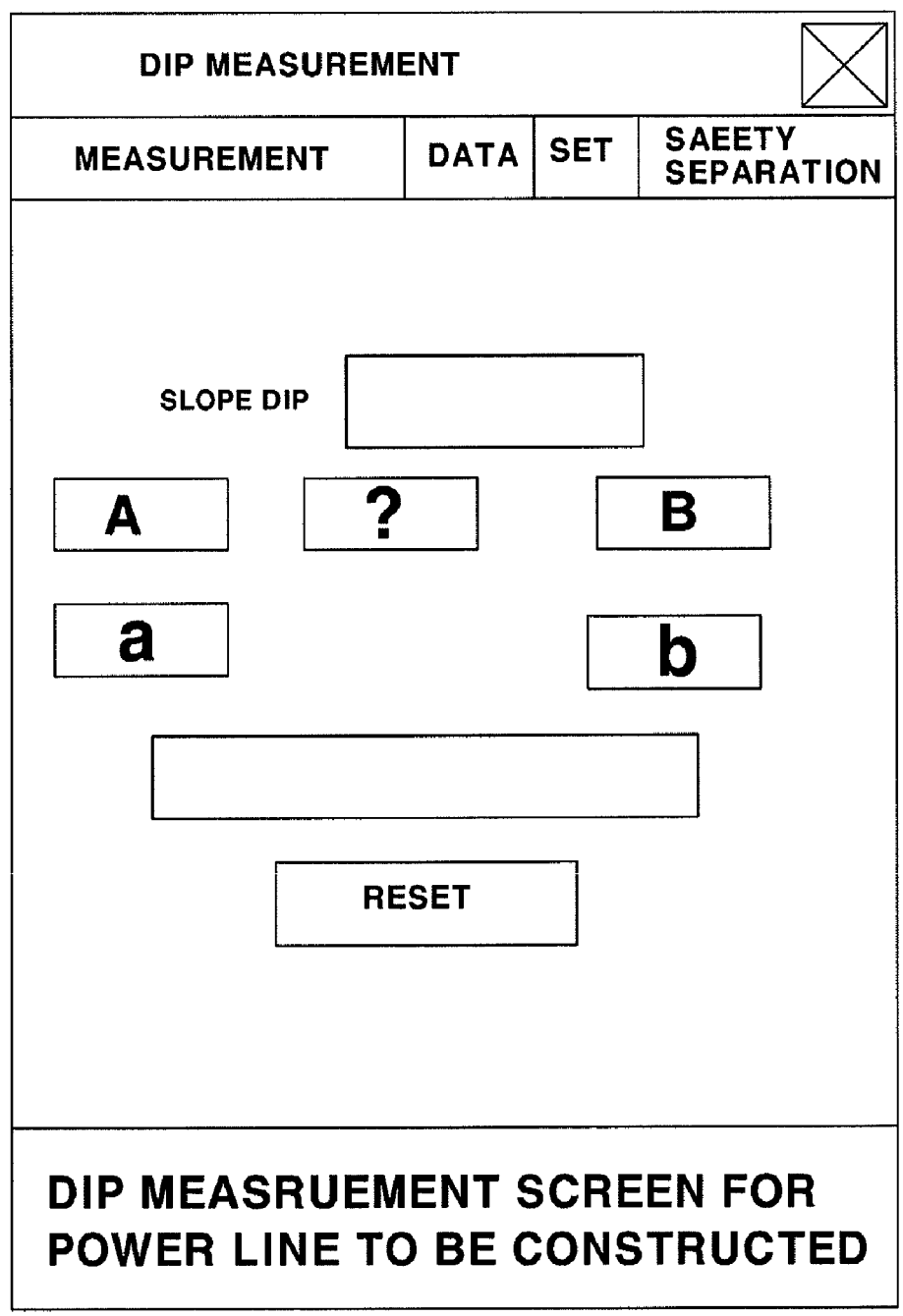
FIG. 8 is a construction view illustrating a dip measurement screen of the PDA during the measurement of the dip of the power line to be constructed according to the present invention.

At this time, a worker inputs a designed dip value into a dip input column on a measurement screen of the PDA 20 as shown in FIG. 8 (ST 1-1).

Subsequently, the measurement instrument 10 is collimated at the power line support point Pa of the steel tower A at which the power line is supported (ST 2), and then an "A" icon on the measurement screen of the PDA 20 is touched by the worker such that a collimated value is transmitted from the measurement instrument 10 to the PDA 20 (ST 3).

Subsequently, the measurement instrument 10 is collimated at the power line support point Pb of the steel tower B at which the power line is supported (ST 4), and then a "B" icon on the measurement screen of the PDA 20 is touched by the worker such that a collimated value is transmitted from the measurement instrument 10 to the PDA 20 (ST 5).

Subsequently, a "?" icon on the measurement screen of the PDA 20 is touched by the worker, with the result that a horizontal angle and a perpendicular angle of a dip base line are automatically calculated and displayed (ST 6).

Subsequently, the worker horizontally adjusts the horizontal angle and the perpendicular angle of the measurement instrument 10 based on the calculated horizontal angle and the calculated perpendicular angle, the measurement instrument 10 is collimated, and finally the construction of the power line is performed (ST 8).

Meanwhile, an "a" icon and a "b" icon on the measurement screens of the PDA as shown in FIGS. 5 and 8 are used when the power line support points Pa and Pb of the steel towers cannot be seen or are interfered with. After the measurement instrument 10 is collimated at a perpendicular line of the power line support point Pa, the "A" icon is touched, and, after the measurement instrument 10 is collimated at the power line support point Pa, the "a" icon is touched. As a result, interference due to trees or the like may be compensated for.

When using the dip measurement method according to the present invention, therefore, it is possible to design dip construction more accurately and objectively than using the conventional dip measurement method in which measurement with the naked eye of each individual worker using a simple measurement instrument is performed during the construction of a power line.

Also, it is possible for a single worker to perform direct measurement without an assistant worker, thereby achieving efficient management of labor.

Also, it is not necessary for a worker to climb the tower, and therefore, it is possible for any one to perform measurement although he/she is not a qualified electrical engineer for power transmission, thereby preventing the occurrence of an accident.

Also, it is possible to directly measure the power line dip point, which will become the dip base point, thereby eliminating the necessity of error connection.

As is apparent from the above description, during the measurement of a dip of an already constructed power line or during the measurement of a dip of a power line to be constructed, the dip of the power line is automatically calculated by a measurement method using a vector calculation equation in which power line support points of two steel towers and a dip point are set to an imaginary space vector, thereby minimizing a measurement error due to individual calculation.

In particular, measurement with the naked eye of each individual worker using a simple measurement instrument during the construction of the lower line is improved, and, in addition, it is possible for a single worker to perform measurement without climbing the steel tower, thereby improving working efficiency and management efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power transmission line dip measurement method comprising:
    a measurement instrument installation step of installing a measurement instrument at a place where power line support points of two steel towers can be seen from the ground;
    a first collimation step of collimating the measurement instrument at the power line support point of one of the steel towers;
    a first transmission step of transmitting a collimated value to a personal digital assistant (PDA) in a wired or wireless manner;
    a second collimation step of collimating the measurement instrument at the power line support point of the other steel tower;
    a second transmission step of transmitting a collimated value to the PDA;
    an angle calculation step of calculating the transmitted collimated values to display a horizontal angle position of a dip base line; and
    a dip value display step of adjusting an angle of the measurement instrument based on the horizontal angle displayed on a screen of the PDA by a worker, collimating the measurement instrument at a power line dip point as a dip base point, and displaying a dip value on the screen of the PDA.

2. The power transmission line dip measurement method according to claim 1, wherein the dip value display step comprises adjusting the horizontal angle of the measurement instrument in proportion to the horizontal angle displayed on the screen of the PDA by the worker, setting an intersection point between the measurement instrument and a power line during the adjustment of the angle of the measurement instrument perpendicularly downward to a power line dip point, and performing collimation.

3. A power transmission line dip measurement method comprising:
    a measurement instrument installation step of installing a measurement instrument at a place where power line support points of two steel towers at which a power line is to be installed can be seen;
    an input step of inputting a designed dip value into a slope dip input column on a screen of a PDA;
    a first collimation step of collimating the measurement instrument at the power line support point of one of the steel towers;
    a first transmission step of transmitting a collimated value to a personal digital assistant (PDA) in a wired or wireless manner;
    a second collimation step of collimating the measurement instrument at the power line support point of the other steel tower;
    a second transmission step of transmitting a collimated value to the PDA;
    an angle calculation step of calculating the transmitted collimated values to display a horizontal angle and a perpendicular angle of a dip base line; and a power line construction step of adjusting an angle of the measurement instrument based on the horizontal angle and the perpendicular angle displayed on a screen of the PDA by a worker, collimating the measurement instrument, and constructing a power line.

4. The power transmission line dip measurement method according to claim 1 or 3, wherein the angle calculation step comprises displaying the horizontal angle calculated based on a power line dip point located on a plane formed by the power line support points and a point obtained by adding an arbitrary number to a z-coordinate value of a center point between the power line support points.

5. The power transmission line dip measurement method according to claim 1 or 3, wherein the angle calculation step comprises performing automatic calculation based on the collimated values in the PDA 20 by a worker touching a "?" icon.

\* \* \* \* \*